US010369566B2

(12) United States Patent
Roy et al.

(10) Patent No.: US 10,369,566 B2
(45) Date of Patent: *Aug. 6, 2019

(54) MICROFLUIDIC DEVICE, COMPOSITION AND METHOD OF FORMING (71) Applicant: National Research Council of Canada, Ottawa (CA)

(72) Inventors: Emmanuel Roy, Paris (FR); Teodor Veres, Montreal (CA)

(73) Assignee: National Research Council of Canada, Ottawa, Ontario (CA)

( * ) Notice: Subject to any disclaimer, the term of this patent is extended or adjusted under 35 U.S.C. 154(b) by 460 days.

This patent is subject to a terminal disclaimer.

(21) Appl. No.: 14/989,320

(22) Filed: Jan. 6, 2016

(65) Prior Publication Data

US 2016/0250633 A1    Sep. 1, 2016

Related U.S. Application Data

(62) Division of application No. 12/588,236, filed on Oct. 8, 2009, now Pat. No. 9,238,346.

(51) Int. Cl.
*B01L 3/00* (2006.01)
*B29L 9/00* (2006.01)
(Continued)

(52) U.S. Cl.
CPC ....... *B01L 3/502707* (2013.01); *B01L 3/5027* (2013.01); *B29C 41/045* (2013.01); *B29C 59/02* (2013.01); *B29C 65/02* (2013.01); *B29C 71/02* (2013.01); *B32B 3/30* (2013.01); *B32B 7/02* (2013.01); *B32B 25/04* (2013.01); *B32B 25/14* (2013.01); *B32B 27/28* (2013.01); *B32B 27/302* (2013.01); *C08J 5/18* (2013.01); *B01L 2200/12* (2013.01); *B01L 2300/0887* (2013.01); *B01L 2300/12* (2013.01); *B01L 2300/123* (2013.01); *B29K 2019/00* (2013.01);
(Continued)

(58) Field of Classification Search
CPC .................................................. B01L 3/502707
USPC ........................................................ 156/245
See application file for complete search history.

(56) References Cited

U.S. PATENT DOCUMENTS 8,268,446 B2 * 9/2012 DeSimone ........ B01L 3/502738
210/600
2004/0187565 A1 * 9/2004 Sutton .................... G01N 13/02
73/54.04

OTHER PUBLICATIONS

Sudarsan et al. "Thermoplastic Elastomer Gels: An Advanced Substrate for Microfluidic Chemical Analysis Systems." Anal. Chem. 2005, 77, 5167-5173.*
(Continued)

*Primary Examiner* — Matthew J Daniels
*Assistant Examiner* — Hana C Page
(74) *Attorney, Agent, or Firm* — Jason E. J. Davis; National Research Council of Canada (57) ABSTRACT

A composition made of at least 60 wt. % of a thermoplastic elastomer resin and additives that are solid at least from 0-50° C., that has a Shore A hardness that is less than about 50 bears a patterned surface, the pattern comprising at least one microfluidic channel having a cross-sectional dimension smaller than 100 microns is a substrate for forming a microfluidic device. The chief advantages of such compositions are: its ability to bond in a sealing manner to smooth surfaces of many different compositions, its ease of manufacture and microstructure patterning, and its general impermeability to liquids.

20 Claims, 4 Drawing Sheets

(51) Int. Cl.
  *B32B 3/30* (2006.01)
  *B32B 7/02* (2019.01)
  *B32B 27/30* (2006.01)
  *B29C 71/02* (2006.01)
  *B32B 27/28* (2006.01)
  *B32B 25/04* (2006.01)
  *B32B 25/14* (2006.01)
  *B29C 41/04* (2006.01)
  *B29C 59/02* (2006.01)
  *B29C 65/02* (2006.01)
  *C08J 5/18* (2006.01)
  *B29K 19/00* (2006.01)

(52) U.S. Cl.
  CPC .......... *B29K 2995/007* (2013.01); *B29K 2995/0026* (2013.01); *B29K 2995/0046* (2013.01); *B29K 2995/0056* (2013.01); *B29L 2009/00* (2013.01); *B32B 2270/00* (2013.01); *B32B 2274/00* (2013.01); *B32B 2307/306* (2013.01); *B32B 2307/536* (2013.01); *B32B 2307/546* (2013.01); *C08J 2309/06* (2013.01); *C08J 2323/04* (2013.01); *C08J 2323/20* (2013.01); *C08J 2325/08* (2013.01); *C08J 2353/00* (2013.01); *Y10T 428/24802* (2015.01)

(56) References Cited

OTHER PUBLICATIONS

Cameron et al. "High fidelity, high yield production of microfluidic devices by hot embossing lithography: rheology and stiction." Lab Chip, 2006, 6, 936-941.*

Holden, G. 2010. Thermoplastic Elastomers. Encyclopedia of Polymer Science and Technology. .*

Kraton G1645M Polymer Data Document.*

Tsao et al. "Bonding of thermoplastic polymer microfluidics."Microfluid Nanofluid (2009) 6:1-16. Publisehd online: Nov. 13, 2008.*

* cited by examiner

MICROFLUIDIC DEVICE, COMPOSITION AND METHOD OF FORMING

CROSS-REFERENCE TO RELATED APPLICATIONS

This application is a divisional application of U.S. patent application Ser. No. 12/588,236 filed Oct. 8, 2009.

FIELD OF THE INVENTION

The present invention relates in general to compositions of matter for forming microfluidic devices, and, in particular, to solid thermoplastic elastomers (TPEs), including TPEs incorporating soft and hard blocks, for this use.

BACKGROUND OF THE INVENTION

There are many microfluidic devices that could be produced, for example, using the structure presented described by Unger, et al. (Science, 288, 113 (2000)), in which one or more polymer layers with embedded channels are assembled and bonded to a substrate. Such devices permit the pattern on a surface of the polymer layers to be covered and thereby enclose the channels to produce a closed device.

There are two major roadblocks to mass-production of plastic-based lab on chip (LOC) and other microfluidic devices, such as those used for biological, chemical and gas detection applications. The first one is related to the availability of high-throughput fabrication technologies that can be used to pattern materials with features having micron to nanometer scales with high through-put, very good critical dimension (CD) control, and low cost. Standard microfabrication processes like those imported from microelectronics, have severe limitations in that they do not apply for materials other than standard processing resists.

The second limitation is related to the nature of the materials that can be processed. For the above mentioned applications, the materials need to be easily shaped while presenting good chemical, optical and mechanical properties. Traditionally silicon substrates were used with various etching techniques on such materials as quartz. Over the last 10 years several micro and nano structuration methods have been developed that promise solutions for mass production of patterned materials at affordable costs. Nanoimprint lithography, nano-embossing, hot embossing and lithography are the most widely used, and the materials most widely used are quartz, galls, silicon, silicone or hard thermoplastic materials (e.g. polycarbonates, PMMA, etc.).

Processing conditions required for the embossing of the commonly used hard thermoplastic materials require significant applied pressure. High quality replication has been achieved with PMMA materials at 180° C. and a pressure of 100 bar (Studer, et al. Chen, *Appl. Phys. Lett.,* 2002, 80, 3614-3616) while Cameron et al. (*Lab Chip,* 2006, 6, 936-941) have reported optimized conditions for PCO materials with an embossing temperature of 40-70° C. above $T_g$ and applied forces of 10-20 bar.

However two major issues are impeding the adaptation of those fabrication methods for the LOC and many other applications. Firstly, low cost, hard thermoplastics materials (polycarbonate, polystyrene . . . ) can be easily shaped and patterned, but the assembly (bonding) of thermoplastic parts to form functional and complex devices or systems with adequate sealing is very difficult and limited by the plastic bonding technologies. Hard thermoplastics need pressure and high temperature processing conditions for bonding constitutive elements. Seals around microfluidic channels are required, and this generally requires very good quality mating surfaces, as the channels are typically defined at interfaces between two parts (usually layers). Additionally non-permanent sealing of hard thermoplastics parts, and resealable bonds are not currently possible.

To avoid these difficulties, elastomer silicone materials have been used instead of hard thermoplastics. There are many advantages to using these materials in terms of less brittleness, and better bonding. Furthermore, they provide for flexibility that may be useful for controlling flow of liquids through the channels. The known methods for patterning (replicating micro- or nano-scale features) silicone elastomers such as PDMS have not been successfully produced in high throughput fabrication processes. So while silicone elastomers have significant advantages in terms of producing bonds for layered structures, silicone elastomer-based microfluidic devices remain costly. Furthermore it is difficult to produce multi-layer PDMS (and expensive to bond multiple layers of PDMS and like silicone elastomer) structures.

Two main options for bonding can be used to bond microstructured layers of PDMS: partial thermal curing process of separate patterned layers, which are subsequently brought in contact together for cure completion; and plasma treatment, in which cured PDMS layers are oxidized in $O_2$ plasma, then finally aligned and permanently bonded. Both approaches need an accurate control of first curing and patterning step in order to preserve a sufficient reactivity for the subsequent bonding step. Thus, successive bonding of several layers becomes difficult, given the time and conditions under which the layers must be assembled. While this is possible in a lab, it is difficult or impossible to produce in a high through-put facility. Thermal bonding is made more expensive by the time it takes and power consumed. Plasma treatment requires expensive controls for material manipulation because once a sample is removed from the plasma chamber (which is a costly treatment) the modified surface properties are un-stable, meaning that the bonding procedure needs to be completed rapidly.

In a paper entitled Thermoplastic Elastomer Gels: An Advanced Substrate for Microfluidic Chemical Analysis Systems to Sudarsan et al. (Anal. Chem. 2005, 77, 5167-5173), a novel class of compounds, namely thermoplastic elastomer gels, are disclosed and tested for properties desired of substrates for microfluidic devices. The TPE gels Sudarsan teaches and uses are highly dilute TPE gels having from 9 to 33 wt. % of TPE (SEBS copolymer resin (CP-9000)) and 67-91 wt. % of mineral oil. The TPE gels were produced using vacuum and heating, which is time consuming and expensive.

Sudarsan et al. teaches a straightforward method for fabrication of microchannel structures using SEBS gels, essentially involving a sequence of steps to create one or more impressions of a negative relief structure in the heated elastomer substrate. For example, according to Sudarsan et al., impressions in a gel (33 wt % TPE, 67 wt. % mineral oil) are made by placing a slab of the gel on top of a master mold that has been preheated to ~110° C. on a hot plate. Within seconds, Sudarsan et al. reports, the elastomer begins to soften and can be gently pressed down by hand for several seconds to make uniform contact with the structures on the mold. After cooling and release, the solidified gel precisely replicates the shape of the structures on the master.

As will be appreciated by those of skill in the art, the oil content and unique structure of gels make them significantly easier to mold. For example, it is well known in the injection molding field that oil added to TPE improves processability of the material. The gel structure is a scaffold of cross-linked molecules having a lower polymer density and therefore requiring less energy to reorganize, than solid polymers.

According to Sudarsan et al., "the gel material inherently adheres to smooth elastomer, glass, or plastic surfaces, allowing static or low-pressure fluidic networks to be easily constructed. In addition, stronger bonds can be achieved either with elastomer or glass surfaces by briefly heating the material at the bond interface to a temperature just below its softening point using a hot plate or handheld heat gun. Bonds to glass surfaces are removable, while bonds between elastomer layers can be made seamless and essentially permanent."

Sudarsan et al. teaches heating the gel to an intermediate temperature regime (~60° C.<T<~90-120° C.), in which structural rearrangements associated with an order-disorder transition permits limited rearrangement of the structure. The upper limit of the intermediate temperature regime varies with the amount of mineral oil, and the oil composition.

At least ⅔ of the material in the gel is mineral oil, and this oil imparts the properties of the gel required for the facile molding technique to be effective. There are nonetheless some drawbacks to the use of these oils in microfluidic applications, and to the gel structure more generally. Firstly, the requirement for producing the gels increases the costs and labour of producing the material, as gels generally are formed by mixing over a significant period of time, under heat and in a vacuum. Secondly certain mechanical properties of the gels, such as rigidity and integrity of the gel, are generally lower than that of solid polymers, which can limit the range of operating temperatures and pressures of devices made of TPE gels. Thirdly, and most importantly for some applications, the permeability of liquids into and out of the gel may limit the kinds of fluids that the microfluidic device can treat. If there is risk of contamination of the sample by the introduction of mineral oil or any impurity contained within the gel, or inversely from absorption of components of a stored fluid into the gel, for example in a given thermal, chemical or mechanical state, or a change therein, the microfluidic device formed of a gel may not be suitable. Also the swelling of gels when in contact with other fluids may further limit the applications of microfluidic devices fabricated from TPE gels, as swelling applies a mechanical pressure that may cause undesired changes fluid dynamics of the overall device.

The surface quality of patterned TPE gels taught by Sudarsan et al. are of concern for many applications. The presence of oil introduces uncertainty and difficulty controlling the surface properties. For example, it is not known how the surface, especially in the neighbourhood of patterned microchannels, is composed. There does not appear to be a patterning technique that can control these surfaces so that they are characterized by a high level of styrene blocks (or EB groups), at the expense of oil. If the surface has high polymer content, it is not known whether the blocks of the copolymer are homogeneous. These parameters are crucial, especially for microfluidic systems, and most especially for systems that require surface modification or treatment. In other areas of research, Applicant has found that oil reduces the surface quality of TPEs leading to highly inhomogeneous surfaces. It does not appear to Applicant that TPE gels are viable alternatives for producing microfluidic devices for a wide range of applications, especially to a majority of applications where introduction of oil into the microfluidic channels is proscribed.

In three works by I. Stoyanov: a thesis (Karlsruhe University) entitled *Development of modular microfluidic devices for bioanalytical sensors*, and papers entitled "Microfluidic devices with integrated active valves based on thermoplastic elastomers" (Microelectronic Engineering 83 (2006) 1681-1683), and "Low-cost and chemical resistant microfluidic devices based on thermoplastic elastomers for a novel biosensor system" (Mater. Res. Soc. Symp. Proc. Vol. 872 J 11.4 pp. 169-174): thermoplastic elastomers are considered for microfluidic applications.

Stoyanov proposes TPU as a reasonable compromise between performance, technological complexity and price for some microfluidic applications, and notes: that some of the thermoplastics reported to be used for production of microfluidic components (poly(methylmetacrylate) PMMA, polycarbonate, polystyrene) do not have sufficient chemical resistance; that thermoplastic polyolefins (polyethylene, polypropylene) possess a very high chemical resistance and can be easily formed by hot embossing, but have poor sealing characteristics due to their non-elastic properties; and that other classes of materials with extraordinary chemical resistance like fluorpolymers (polytetrafluoroethylene (PTFE) or excellent sealing properties like silicones (PDMS) are difficult to be reliably connected with macrofluidic components, because of their chemical inertness (PTFE) or lack of sufficient mechanical strength (PDMS).

These works use thermoplastic polyurethane elastomer foils TPU (a specific grade of TPE) having a Shore A surface hardness of 85-93. Clearly TPUs were chosen in part because of their surface hardness being only sufficiently less than those of polyethylene, and polypropylene to overcome their sealing problems, because softer materials such as PDMS are stated to lack required mechanical strength.

Because of the relative inelasticity of TPUs, Stoyanov must work with thin foils (100-600 μm thickness) to obtain a required flexibility. Consequently they can not impart features of certain depths. Because of the thin foil structure, Stoyanov was further unable to bond two microstructured foils due to major deformations. Thin foils bend too much, inducing leakage.

It is further noted that Stoyanov required high pressure and temperature (50-120 bars and 140-160° C.) to thermoform the foils, which induces more shrinkage, higher friction and longer cycle time than lower pressure and temperature methods. The thermoforming requires use of metallic molds, and cannot be performed with low-cost molds.

Further still, TPU are not capable of room temperature, atmospheric pressure or low pressure bonding (either permanent or reversible). To bond together TPU parts (or TPU and others plastic substrates), Stoyanov applied pressure to contacting surfaces and they also needed to use treatment involving solvent exposure, or thermal bonding to achieve satisfactory bonds. These treatments, and the pressure needed for bonding, can be detrimental to the preservation of (bio or chemical) surface treatments and/or to the quality of the features patterned on the surface. Delicate features may deform or collapse under the pressure, changing microfludic behavior of the devices (flow time, capillary effects, etc.) of the device, especially if a multi-layered device is desired.

Accordingly it is noted that viable elastomeric materials used in microfluidics have all had Shore A hardnesses above about 85 (i.e the top end of Shore A-Shore D hardness). The only known exception to this is Sudarsan et al., who teaches a gel having potential problems with integrity. Gels used according to the teachings of Sudarsan et al. have Shore hardnesses in the mid to lower range of the Shore OO scale.

At Nanotech Montreux 2007, applicant submitted a title for a poster presentation but did not present any poster there. The title was: Thermoplastics Elastomeric (TPE) Blocks Copolymers, a New Material Platform for Microfluidics: Proof of Concept for Complex Siphon Valving on CD, and this title was published.

Accordingly there is a need in the art for new materials for use in microfluidic devices that are as easily patterned and bonded as the TPE gels, but not subject to the drawbacks of the TPE gels. In general there is a need for compositions that can be patterned, and bonded to like compositions as well as a variety of other compositions, while providing seals required for very fine channels such as microfluidic channels, and remaining relatively inert and non-reactive to a wide variety of fluids.

SUMMARY OF THE INVENTION

Applicant has discovered, unexpectedly, that solid soft (Shore A hardness that is <~50, more preferably 1 . . . 45, 1 . . . 40, 5 . . . 38, and most preferably 10 . . . 35) TPEs, have many of the advantages of (non-solid) TPE gels in terms of patterning and bonding, while providing inert, non-reactive, and higher integrity materials for producing microfluidic channels. There are various advantages over different prior art microfluidic substrate types. Herein the prefix "micro" refers to smaller than 0.1 mm, and includes nano-scale channels, fluidics, etc.

Gels are highly dispersed polymer chains whereas soft solid TPEs are polymer dense. TPE gels have Shore O, and Shore OO hardnesses, with Young's Moduli ranging from about 0.01-10 MPa. These gels can be formed into slabs as shown by Sudarsan et al. that are quite thick, but it may not be trivial to produce, manipulate and pattern thin, uniform webs of this material. These slabs can be patterned with only gentle manual pressure on a hotplate, as taught by Sudarsan et al. Sudarsan then teaches the possibility of pressure free bonding to produce low pressure or static pressure microfluidic networks, but that if higher pressure is required, thermal bonding is possible.

TPE gels have problems retaining the mineral oil or other extender/solvent through relatively permeable surfaces. It is well known in the art that the mineral oil in such gels escape over time resulting in shrinkage of the slab, and potentially diluting, tainting, or otherwise interfering with fluids in a microfluidic device. Over a wide range of temperatures and pressures, and throughout changes within the range, soft solid TPEs do not bleed or interact with a contacting liquid.

The differences in structures and polymer densities between TPE gels and soft solid TPEs would not suggest that soft solid TPEs are equally disposed to provide the patterning advantages of TPE gels. Surprisingly applicant has found that soft solid TPEs can be patterned as solid films without any pressure (except atmospheric pressure), for example, if the web is 0.5 mm thick (or more), the feature density is 40% (or less) and the features are 50 µm deep (or less). In general a nominal pressure form 0.01 to 0.5 MPa can be used to assist pattern formation in other conditions. Furthermore Applicant has found that soft solid TPEs can be spin cast or solvent cast using appropriate solvents (benzene, chlorobenzene, toluene, . . . ). These methods permit relatively low cost, high quality photoresist molds to be used for the patterning.

It is known to use hard thermoplastics in microfluidics. Such materials generally have a Young's modulus of 1,000-10,000 MPa (i.e. having a Shore hardness on the D scale, ~40-85). While they can be formed into films or webs relatively easily, patterning generally requires 10 MPa or more of pressure, and therefore high pressure molds must be used, such as those made of metal, or silicon. Hard plastics have some perennial demolding issues. Demolding of hard plastic parts remains problematic due to the stiffness of the material. Demolding induces stresses on the patterned surface that damage edges of the patterned parts, and friction between the mold and part are another source of damage. Soft, solid TPEs due their mechanical properties, are not subject to such behaviour. The microchannels produced are free of defects. Furthermore, because demolding is improved, we have been able to use low cost molds such as epoxy and SU8 ones, and even we have been able to mold TPE parts with high aspect ratios, and even negative profiles.

Furthermore there are difficulties bonding hard thermoplastic layers to provide seals, generally requiring bonding agents, solvents, etc. and/or high temperature and pressure to produce a stack of the materials, all of which may make surface chemistry or desired coatings more difficult to maintain, and risk micro-patterned structures collapsing or deforming, leading to changes in microfluidic behavior (flow time control and capillary effects which are both critical in term of dimension). Hard thermoplastics generally have poor gas permeability even at elevated temperatures, which can lead to entrapment of bubbles, and are inflexible resulting in defects when demolding. Some softer TPEs are also known but have limitations discussed above.

It is also known to use non-TPE materials, such as PDMS, but patterned layers of PDMS are not readily mass produced. The speed and cost with which PDMS can be patterned have made it suitable to special purpose, prototype, and other limited-run devices, where the necessary equipment exists. There are also problems with PDMS in that it may be difficult or impossible to bond many layers without damaging the patterned structure of intermediate layers, and it is increasingly desirable to provide multi-layered microfluidic devices. The materials are also relatively expensive.

A variety of solid soft (Shore A=1 . . . 50) TPEs may be used in accordance with the present invention. Soft solid TPEs diverse in composition, chemistry and morphology, have permeability coefficients for nitrogen and oxygen gas that are 20 to 400 times lower than that of PDMS at room temperature. Exemplified soft solid TPEs (styrenic-TPE and ethylene vinyl acetate polymers) have $N_2$, $CO_2$, and $O_2$ gas permeabilities ranging from $5*10^{-3}$ to $7*10^{-10}$ $cm^3$ (STP) $cm/cm^2$ s cmHg), which is believed to significantly reduce entrapment of air bubbles between a mold and the soft solid TPEs, facilitating high fidelity, low temperature, and low pressure-time patterning and allowing thermoforming without vacuum assistance (Vacuum chamber for forming). The softness of TPEs also generally facilitates bonding as the material conforms intimately to a wide variety of smooth surfaces. Specific gas permeabilities, elastic, compressibility and zero shear rate properties of a variety of soft solid TPEs make a high-throughput thermal replication method possible, and permit simple, low pressure bonding (permanent or reversible) of patterned parts to a variety of substrates.

In some aspects of the invention, the soft solid TPEs are block copolymer (BCP) TPEs, which typically have mechanical modulii 2-3 orders of magnitude lower than those of hard thermoplastics. BCP-TPEs exhibit zero shear viscosity values 3 to 6 orders of magnitude lower than those of hard TP, offering a partial explanation as to why BCP TPEs such as styrenic block polymers (e.g. SBS, SEPS, SIS, SIBS, and SEBS, especially those containing about 85-90% soft blocks), can be patterned with high fidelity using low temperature (down to atmospheric pressure), and low pressure-time molding.

Accordingly a composition is provided, the composition made of at least 60 wt. % of a thermoplastic elastomer (TPE) resin and additives that are solid at least from 0-30° C. (preferably at least from 0-50° C.), the composition having a Shore A hardness that is less than 50, and bearing a patterned surface, the pattern comprising at least one microfluidic channel having a cross-sectional dimension smaller than 100 microns.

The composition preferably comprises at least 80 wt. %, 90 wt. %, 95 wt. %, 98 wt. %, 99 wt. %, and 99.5 wt. % of the TPE resin.

The microfluidic channel preferably: extends between two ends, each end being one of the following: an input, an output, a junction or a chamber, is a closed chamber, has an aspect ratio between 1:10 and 10:1, or has a negative profile.

The patterned surface is preferably adapted to provide: a reversible seal when applied to a smooth surface at ambient temperature and pressure; an irreversible seal when applied to a smooth surface at temperature below 150° C., under a pressure less than 0.5 bars (or more preferably 0.3 and 0.2 bars), for less than 1 hr; is irreversible and applied with a ambient temperature and pressure, for example over a period of 4 days.

The TPE resin preferably has a viscoelastic phase that exhibits liquid-like flow at temperatures below 20° C., more preferably below 0° C. The TPE resin may have soft and hard blocks, the soft blocks having a glass transition temperature below 20° C., more preferably below 0° C., more preferably between −60 and −100° C. The TPE resin may be: a styrenic block polymer, an olefin vinyl polymer, a thermoplastic rubber, a copolyester, a polyurethane, a polyolefin blend, a polyolefin alloy, or a polyamide; or a styrenic block polymer, or an olefin vinyl polymer; or a styrenic block polymer; or SBS, SEBS, SEPS, SIS, SIBS, EVA, COPE, TPU, TPO, TPV, PEBA, or TPE based acrylic, or SBS, SEBS, SEPS, SIS, SIBS, or EVA, or SBS, SEBS, SEPS, SIS, SIBS, or SEBS; or oil free SEBS and the composition has a thermal resistance greater than about 95° C.

Accordingly a microfluidic device comprising the composition is provided. The microfluidic device may further comprising a second part having a first meeting surface, the first meeting surface covering enough of the patterned surface to enclose at least part of the microfluidic channel. The second part may be: composed of a same, similar or dissimilar thermoplastic elastomer as the first part; in the form of a film; composed of a less flexible material than the first part, to support the microfluidic device; composed of a material chosen for thermal resistance, to support the microfluidic device at an elevated temperature. The second part may have a second meeting surface bearing a pattern comprising at least one microfluidic channel having a cross-sectional dimension smaller than 100 microns. The second part may be composed of a similar thermoplastic elastomer, and having a second meeting surface bearing a pattern comprising a groove defining at least one microfluidic channel having a cross-sectional dimension smaller than 100 microns, and be irreversibly bonded to the composition.

Also in accordance with the invention, there is provided a method for forming a microfluidic device, the method comprising: providing the composition onto a relief mold having at least one ridge defined thereon for forming a microfluidic channel on the surface; heating the composition adjacent the relief mold above a highest glass transition temperature of the thermoplastic elastomer, for a pressure-time of less than 5 bars seconds per micron of depth of the relief mold; and cooling the composition and removing it from the mold as a part, whereby the substantially smooth surface is patterned.

The ridge of the relief mold may extend between two of the following: junctions with one or more other ridges, raised structural features of the mold, and a mold limit aligned with an edge of the part.

The method may further comprise bonding the part to a second part as per the structure of the microfluidic device.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Solid soft thermoplastic elastomers (TPEs) are formed from at least 60 wt. % of a TPE resin and other additives that are solid over a wide range of temperatures, (e.g. 0-50° C.) form a new class of materials for forming microfluidic devices. Additives well known in the art include inert additives such as filler, as well as or may be used to affect one or more property of the soft solid TPE (such as additives to improve optical properties, thermal properties, adhesiveness (e.g. tackifiers), plasticizers), or additives to facilitate curing or processing of the material. The soft solid TPEs preferably contain 80, 83.33, 90, 95, 98, 99, or 99.5 wt. % of the resin and solid additives. They have advantages not previously recognized in these applications. The 40% or less balance of the composition may include non polar mineral oil, such as naphtenic and paraffinic based ones (among others oils), or other known processing aids, or additives that affect a material property of the polymer.

Herein a TPE is said to be "soft" if it has a shore A hardness that is less than 50. More preferably soft TPEs have Shore A hardnesses of 1-45, 1-40, 5-38, and most preferably they have Shore A hardnesses from 10-35. A TPE is said to be solid if it is a non-gelatinous, non-liquid material that has substantial material integrity in operation as a microfluidic device. TPE's typically have a network that consists in large part of non-covalent, hence reversible cross-links (e.g., hydrogen bonding, van der Waals interaction or electrostatic interplay). Upon heating, non-covalent bonds can be broken, which makes the material deformable. Under cooling, the crosslinks are restored, thereby preserving shape and form induced during thermal treatment. Moreover, this feature makes it possible to recycle material in case thermoforming processes have failed, or if it is desirable to repattern the material for a different use. There are six classes of commercial TPEs presently used: styrenic block copolymers, polyolefin blends, elastomeric alloys (TPE-v or TPV), thermoplastic polyurethanes, thermoplastic copolyester and thermoplastic polyamides. Some examples of these would not be suitable because the Shore A hardness would be greater than about 50, for example, but in general there are examples from each class that are amenable to application in microfluidic devices, especially given the varieties of materials that can be produced with different molecular weight polymers, and different amounts of plasticizers and other additives.

A styrenic block polymer, an olefin vinyl polymer, a thermoplastic rubber, a copolyester, a polyurethane, a polyolefin blend, a polyolefin alloy, or a polyamide TPE, are classes of preferred TPEs. The following compounds are preferred TPEs: SBS, SEBS, SEPS, SIS, SIBS, EVA, COPE, TPU, TPO, TPV, TPE based Acrylic, or PEBA. More preferably, the TPEs are: SBS, SEBS, SEPS, SIS, SIBS, or EVA. More preferably still, are SBS, SEBS, SEPS, SIS, SIBS. Examples of an ethylene vinyl acetate polymer compound and several styrenic block polymer compounds, are described herein below. Preferably the TPE has a viscoelastic phase that exhibits liquid flow at temperatures below 200° C., more preferably 180° C., more preferably below 150° C. are preferred.

A wide variety of soft solid TPEs have similar viscoelastic and polymer flow conditions at (respective) processing temperatures that promote intimate surface contacting with a die, and result in surfaces that are able to bond to a variety of surfaces with minimal temperature, pressure and time. If the elastic modulus and zero shear rate properties are satisfactory, at specific soft solid TPE formulation will be satisfactory. Most TPEs are block copolymers (BCPs), comprising different monomer sequences being distributed either randomly, statistically and even in larger domains through diblock or triblock architectures. BCP-TPEs exhibit two glass transition temperatures corresponding respectively to soft blocks providing softness and bonding properties and hard blocks acting as junction points that stabilize the polymer matrix which provide the desired rigidity. Generally BCP-TPEs are amenable to the present invention. Preferably the soft blocks have a viscoelastic phase that is exhibits liquid flow at temperatures below 200° C.

In a first approach and for one part, TPE replication takes advantage of mechanical modulii that are typically 2-3 orders of magnitude lower than those of hard thermoplastics. More rigorously, according to Stephan's equation, the force required for polymer micro-displacement is linearly proportional to the zero shear viscosity parameter ($\eta_0$). (*Alternative Lithography: Unleashing the Potentials of Nanotechnology*, ed. C. M. Sotomayor Torres, Kluwer Academic/Plenum Publishers, New York (2003), the contents of which are incorporated herein by reference). For PMMA, PS and PC materials, through typical embossing temperature ranges, with several hundreds of thousands molecular weight polymers and at typical low shear rate values of $10^{-4}$-$10^{-1}$ s$^{-1}$, $\eta_0$ ranges from $10^5$ to $10^{10}$ Pa s at their respective embossing temperatures. Such viscosity values result in a need for several tens of bars of pressure to be applied, to induce polymer displacement rates in the range of 1 µm/s (see Yao, et al. *Polym. Eng. Sci.*, 2007, 47, 530-539, and Juang et al. *Polym. Eng. Sci.*, 2002, 42, 539-550, the content of both of which is incorporated herein by reference).

In contrast, soft solid BCP-TPE materials (especially those with a percentage of hard blocks inferior to 15%) show values of $\eta_0$ in between $10^2$ and $10^4$ Pa s, as reported by Sebastian et al. (see Sebastian, et al., *Macromol.*, 2002, 35, 2700-2706 and *Macromol.*, 2002, 35, 2707-2713, the content of both of which is incorporated herein by reference) using steady-shear low-stress rheology experiments with styrene-isoprene-styrene block copolymers, which are largely comparable to the SEBS material selected for this study. Based on these reports, we can assume that BCP-TPE zero shear viscosities values can be 3 to 6 orders of magnitude lower than those of hard TP, thus explaining the attractive processing conditions, such as short embossing time and low pressure needed for high quality pattern replication.

Furthermore, soft solid TPEs are particularly suitable for forming because of their gas permeabilities. During heating of the material without any external pressure (i.e. under only atmospheric pressure), we observed that the air bubbles trapped between the mold and the polymer disappear, which indicates a relatively high gas permeability of the TPE material at elevated temperatures. In fact, for stryrenic TPE based material, crystallized PS nanodomains interrupt the gas flow and retard permeation in comparison to the soft and more permeable soft blocks (EB, I, EP, . . . ).

Although soft solid TPEs are diverse in composition, chemistry and morphology, the literature suggests that permeability coefficients for nitrogen and oxygen gas can be 20 to 400 times lower than that of PDMS at room temperature (for $N_2$, $CO_2$, and $O_2$, gases permeability values for styrenic-TPE and ethylene vinyl acetate polymers range form 0.005 to $7.10^{-10}$ cm3 (STP) cm/cm2·s cmHg) (see Csernica et al., *Macromol.*, 1987, 20, 2468-2471, Yang et al. *J. Appl. Polym. Sci.*, 1990, 41, 1141-1150, Odani et al. *Polym. Eng. Sci.*, 1977, 17, 527-534, Kim et al., *J. Appl. Polym. Sci.*, 1997, 66, 1117-1122, Ferdinand et al., *Colloid Polym. Sci.*, 1989, 267, 1057-1063, Senuma, *Macromol. Chem. Phys.*, 2000, 201, 568-576, Schauer, et al. *J. Appl. Polym. Sci.*, 1966, 61, 1333-1337, and Barnabeo et al., *J. Polym. Sci.*, 1975, 13, 1979-1986).

Methods of Patterning

The mechanical and flow properties (such as viscoelasticity) of the soft solid TPE materials outlined above permit very simple and low-cost methods for microstructure patterning that obviates the need for high pressure presses and molds, chemical solvents, etc. and is amenable to mass production. Furthermore expensive vacuum equipment can be avoided for atmospheric pressure molding of relatively low depth features.

Figure 1:
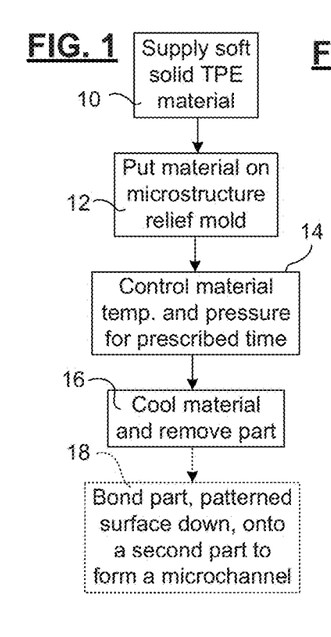
FIG. 1 is a schematic flow chart of a high throughput method for forming (thermoforming) a part of a microfluidic device in accordance with an embodiment of the invention.
Figure 1A:
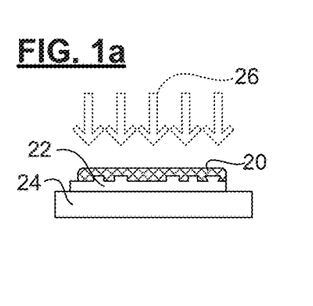
FIG. 1a is a schematic illustration of an apparatus for forming a patterned piece in accordance with an embodiment of the present invention.

FIG. 1 is a schematic flow chart illustrating the chief steps of a high throughput method of forming a patterned piece for use in a microfluidic or nanofluidic device, and FIG. 1*a* is a schematic illustration of an apparatus for forming a patterned piece for use in a microfluidic or nanofluidic device, in accordance with an embodiment of the invention.

In step 10 a soft solid TPE as described above is provided. Applicant has demonstrated a number of methods of producing patterned parts, including such techniques as spin casting and solvent casting using appropriate solvents (benzene, chlorobenzene, toluene, . . . ), however, advantageously, the polymer can be provided in a substantially neat form, obviating the need for high quality exhaust, purification, and/or solvent reclamation equipment.

There are three states in which the polymer can be provided: solid, liquid, or solution. If solid, the part can have substantially any form having a relatively smooth surface for placement on the mold. The part may be joined to one or more other parts as well. The preferred solid form in which to supply the part, for mass production, is a film. Films of high purity, and controlled thickness, can be provided with film extrusion techniques known in the art. If the material is supplied as a liquid, such as in an injection molding system, high speed patterning and forming can be provided. As a solution, spin coating can be performed, although this technique is believed not equally susceptible to high throughput production. Spin coating may be preferred for high quality parts having high feature density or very small dimensions.

In step 12, the material is placed on a microstructure relief mold, either by injection of the soft solid TPE as molten material, or as a solid part. In FIG. 1a the soft solid TPE material 20 is shown making intimate contact with a mold 22, which the material 20 will do once the material is at or above the mold temperature and pressure conditions. In accordance with the invention, the mold can be an inexpensive, relatively low pressure mold, such as SU8 molds formed by well known lithographic techniques. While the mold shown in FIG. 1a is a plate-type mold, it could have a variety of shapes. The mold may be part of an enclosed space, as used for injection molding. In practice, substantially any mold that can survive the heat cycling, provides modest strength, and supports a relief will serve to mold a wide variety of the solid soft TPE films.

Figure 4:
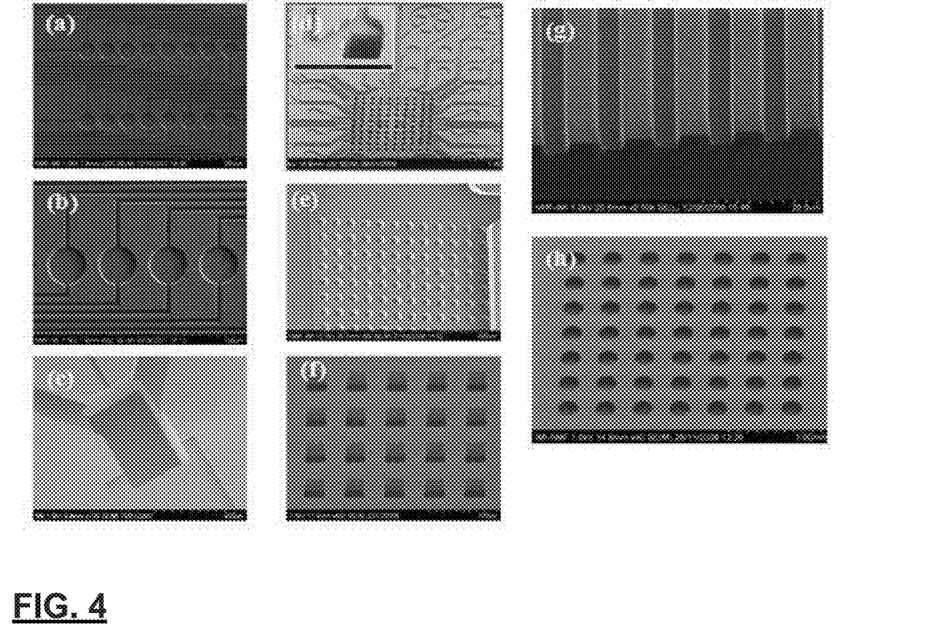
FIG. 4 is a mosaic of SEM images showing microstructure patterning of soft solid TPEs using hot embossing and soft lithography.

It will be noted that the mold 22 of FIG. 1a can include a variety of features, including high aspect ratio molds, and even negative profile features. A variety of features produced are shown in FIG. 4, and are discussed below. Demolding is greatly facilitated by the flexibility of the soft solid TPE, and high aspect ratio (AR) features can be reproduced with high fidelity. The rigid nature of hard thermoplastics makes demolding difficult or even impossible when high aspect ratio features are required. Due to the low elastic modulus and low melt viscosity of TPE, it is possible to easily pattern high aspect in TPE by thermoforming methods (e.g. hot embossing, as well as by injection molding) without the complications that are typically encountered with TP.

Applicant has patterned features having dimensions as small as 10 μm in a 100 μm thick TPE slab (with an aspect ratio up to 10:1). Soft solid TPEs are so forgiving because of their compressibility; they can be molded flawlessly with higher aspect ratios and even negative profiles. Features having negative profile, such as features that have a higher cross-sectional area further from a plane of the mold have been reproduced. Top cross-section area might be in the range of 5×5 mm$^2$ to 0.01×0.01 mm$^2$, while bottom cross-section deals with areas which can be from 99% to 25% of the top one. Soft solid TPEs have demonstrated very low pressure patterning and bonding, and avoid the previously noted problems with the quality of replication of edges of hard thermoplastics.

In step 14 the temperature and pressure of the material is controlled to permit molding. The surface of the soft solid TPE part adjacent the mold is heated to a temperature above the glass transition temperature of the hard domain materials, but below the glass transition temperature of the soft blocks (for diblock polymer materials) otherwise above a glass transition temperature of the polymer system in order to mold.

If the material is provided in a liquid form, it is initially at a temperature higher than needed for molding, and controlling the temperature involves controlling the cooling rate. If the material is provided at a temperature and pressure below the molding conditions, the material will be heated to a temperature, and/or subjected to a pressure to match or exceed the molding conditions, for example by heating the material 20 directly (conductively, convectively, or radiatively), or by heating the mold or other element in contact with, or adjacent the material 20.

In some embodiments, no external pressure (i.e. other than atmospheric pressure) is required, for example if the surfaces are substantially smooth and surface roughness is fully compensated by surface elasticity of the film. If the material was inserted as a cold part (film or otherwise), heating is applied to the material while it is on the mold. While this heating and/or cooling could be controlled in any number of ways known in the art, in FIG. 1a, a hot plate 24 is provided for this task, which heats the mold 22, which in turn, imparts the heat to the material 20. Applicant has demonstrated patterning of a SEBS foil with only atmospheric pressure, at a temperature of 170° C., with a cycle time of 150 s, as is described below. Applicant has demonstrated patterning of a Evatane foil with only atmospheric pressure, at a temperature of 100° C., with a cycle time of 150 s, as is described below.

Other embodiments use some pressure 26 to expedite patterning. Depending on a thickness of the part, a desired time, and a relief depth of the mold, some pressure, such as less than 5 bar, preferably less than 4 bar, 3 bar, 2 bar or 1.5 bar, may be applied. The reduced pressure and temperature requirements for patterning of soft solid TPEs opens the door to very low cost, reliable, high-throughput patterning techniques. Pressure required for patterning TPEs is 1-2 orders of magnitude smaller than the pressure required for embossing commonly used TPs (i.e. ~1 bar instead of ~10 s-100 s of bars).

In terms of quality, soft solid TPE molded structures show well-defined shapes and excellent surface quality, additionally, any defects related to the influence of the shear force resulting from the difference of thermal expansion coefficient of the polymer and the mold has been observed. Defects perennially encountered when patterning hard thermoplastics (Y. He, J.-Z. Fu and Z.-C. Chen, Microsy. Technol., 14, 325 (2008) and M. Worgull and M. Heckele, Microsy. Technol., 10, 432 (2004) such as edge damage and asymmetric pull-off of plastics part due to interfacial friction are absent. This is mainly attributed to the capabilities of TPE materials to sustain deformation through their compression set characteristics (i.e. 11% at 23° C. for CL30 TPE styrenic material).

In step 16, the material 20 is cooled and the patterned piece is removed from the mold 22. This cooling can be performed quickly, for example by immersion into a water bath, with no damage to the materials or the patterned structure.

In optional step 18, the cooled part is bonded patterned-surface down, onto a second part to form a microfluidic device having at least one microchannel. The microchannel may extend between two ends, each of the ends being an input, an output, a junction or a chamber. The second part may be of a similar composition, or a dissimilar composition. It may be preferable for one layer in a multi-layer device to have substantial rigidity.

A patterned part (either made by thermoforming methods or spin coated method) of soft solid TPE can be assembled by placing the patterned surface on a smooth substrate (plastic, glass, ceramic, etc.), or an already patterned TPE part. Minimal force is required for bonding (in general no force other than atmospheric pressure is required once contact is made), and as most soft solid TPEs adhere to itself readily, stacks of these patterned parts may be successively assembled without risk of deforming microchannels between other layers. In some cases, layers can be reversibly bonded at ambient temperatures, and bonding can be made irreversible with thermal treatment. In other cases at room temperature, after a bonding period, the bonding is irreversible. However other materials require thermal treatment to provide liquid-tight bonds to like layers, but do not require pressure above about 1.5 bars, more preferably 1.3 bars, more preferably 1.2 bars, to fully bond.

It is believed that for the broad class of soft solid TPEs, that bonding to like layers can be performed with moderate thermal conditions (lower than the melting point of the soft solid TPE) and with low pressure (i.e. total pressure (atmospheric+applied) less than 1.5 bars, more preferably less than 1.3 bars, more preferably less than about 1.2 bars), and further that soft solid TPEs may be bonded to dissimilar surfaces to provide a liquid-tight seal, under similar temperatures and pressures. Because of the softness of soft solid TPEs, they form intimate contact with surfaces composed of a wide variety of materials. If soft enough (e.g. E' below 5 MPa) TPEs may conform at the molecular level, hence promoting a perfect, watertight seal with a number of substrates (e.g., plastics, glass, and silicon). It is believed that several soft-solid TPEs formulations that incorporate tackifiers can be adequately bonded at room temperature to like materials and different materials to provide a seal, as desirable for microfluidic devices.

Soft solid block copolymer TPEs that contain 15% or less of the hard block component are particularly advantageous with respect to bonding. Without wanting to be limited by the foregoing theory in all aspects of the present invention, Applicant explains the ability for soft solid BCP TPEs to locally reconfigure with the properties of the soft polymer chains (such as ethylene-butylene EB blocks) contained in a coblock polymer. Soft solid BCP TPEs are formed with two types of segments (one soft, one hard) which are (bonded along each polymer chain. The soft segments exhibit viscoelasticity to a high degree, and can flow at moderate temperatures, permitting very close forming of the copolymer at moderate temperatures, and further providing for very high elasticity of the material. This flow of the soft blocks is believed to permit bonding to a wide variety of surfaces having the various compositions.

Figure 8:
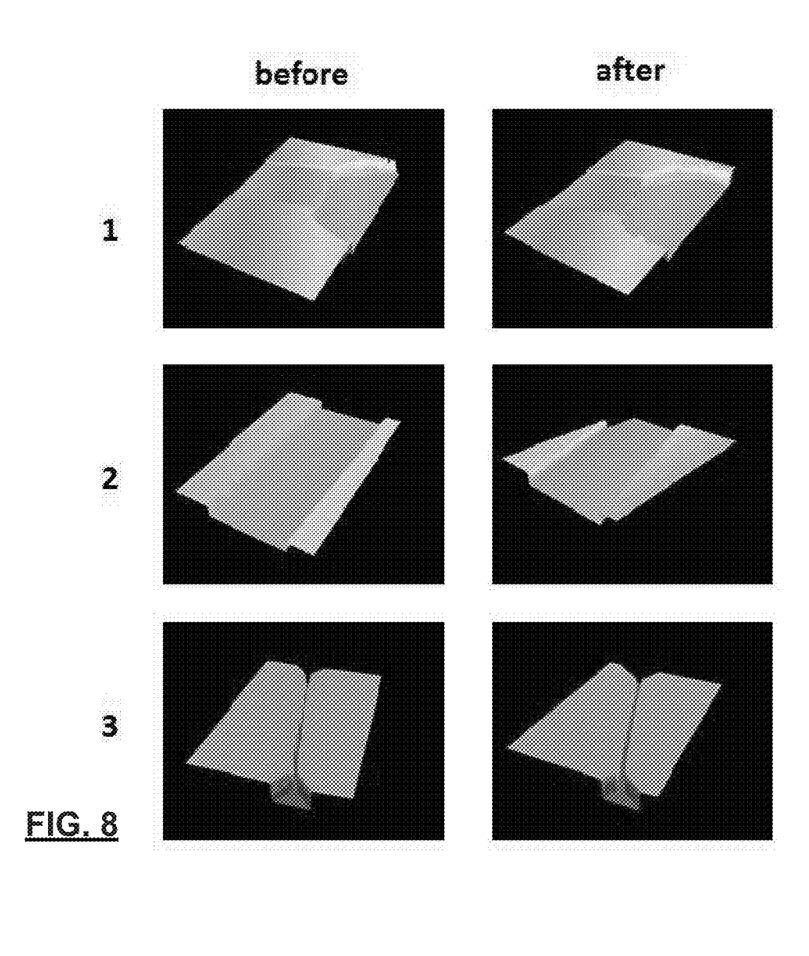
FIG. 8 are results of a profilometric study of TPE microchannel stability showing images before and after a thermal treatment at three locations, and an SEM image of three microchannels after the same thermal treatment.

In particular, for styrenics BCP with low styrene content (i.e hard block content) (10-12%), thermodynamic incompatibly between blocks induces nanophase separation and self-assembly of polystyrene (PS) domains into nanometric clusters (10-30 nm in diameter) which are distributed in a three-dimensional fashion with hexagonal symmetry in the rubbery matrix of ethylene-butylene (EB) (FIG. 8). This morphological structure provides the basis of the material's performance: rigid PS domains act as junction points that stabilize the polymer matrix, while the EB dominant phase offers elastomeric properties at room temperature and previously discussed bonding properties.

Moreover, such size and cluster distribution allow us to consider TPE surface properties to be uniform and homogenous at the microfluidic scale for devices that are fabricated from this material (see Roy *Thermoplastic Elastomers (TPE) Block Copolymers, a New Material Platform for Microfluidics: Proof-of-Concept for Complex Siphon Valving on CD*, in: Proceedings of the 12th International Conference on Miniaturized Systems for Chemistry and Life Sciences, San Diego (2008), the content of which is incorporated herein by reference. For further reading the interested reader is referred to a comprehensive overview published by Holden. G. Holden, N. R. Legge, R. Quirk and H. E. Schroeder, Thermoplastic Elastomers, 2nd edition, Hanser-Gardner Publications, Cincinnati (1996).

The styrenics BCP (SEBS, SIBS) materials, without any tackifier, was found to adhere spontaneously with planar surfaces, and the contact line propagated across the entire substrate without the need of applying any external pressure.

Figure 5:
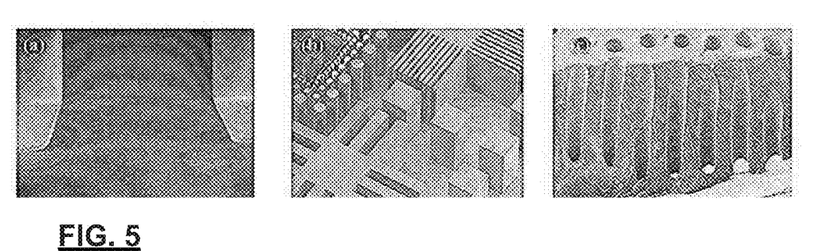
FIG. 5 includes three SEM images showing patterns that are dense, have high aspect ratios, and have micrometric features having a negative profile.

Soft solid TPEs may be chosen to operate in a variety of thermal regimes. For example, widely used PCR (polymerase chain reaction) devices operate at temperatures around 95° C. While this would be impossible with TPE gels, oil-free soft solid TPEs can operate within this temperature range. Demonstrated of soft solid TPEs that can sustain service temperatures of 95° C. for 60 minutes without microchannel damages or leakage is provided herein below (FIG. 5)

While the foregoing embodiments provided one route to fabricating a part for a microfluidic device, it will be appreciated that other forming and patterning techniques could equally be used. Most soft solid TPE materials can be dissolved in solvents (benzene, chlorobenzene, toluene, etc. the selection of which is well within the abilities of on of ordinary skill in the art) permitting spin coating and solvent casting forming technologies to be used for TPE film microstructuration. Spin casting has known value for producing thin membranes with highly uniform depth and excellent feature reproduction. Applicant has patterned microstructures as small as 10 µm by spin casting, and smaller features can be produced as easily, given suitable molds.

EXAMPLES

Applicant has demonstrated that solid soft TPE films, such as those formed of styrenic block copolymers including styrene-ethylene-butylene-styrene (SEBS) and SIBS (styrene)/(isobutylene)/(styrene)) for one part and non blocks polymers such as ethylene vinyl acetate (EVA) polymer, can be patterned with high fidelity microfluidic channels using low temperature and low pressure-time thermoforming, and further that solid soft TPEs have advantageous properties in terms of bonding. Styrenic block copolymer elastomer is composed of diblock, triblock, star block, other multi-block structures, or blends of these structures.

Soft Solid TPE Materials and Characterizations

The experiments focused mainly on soft solid styrenic block copolymer TPEs. Three commercially available grades of styrene/ethylene/butylene/styrene (SEBS) block copolymers (Versaflex SEBS CL30 from GLS Corp, McHenry, Ill., USA; and SEBS MD6945 and G1657 from Kraton Polymers, Houston, Tex., USA) and one styrene/isobutylene/styrene SIBS compound (SIBSTAR 072T from Kaneka, Houston, Tex., USA) were purchased. These SEBS compositions have 10-12% PS blocks. For the ethylene vinyl acetate (EVA) TPE material, EVATANE 62-40 was purchased from Arkema Inc. Philadelphia, Pa., USA. Additionally, we have used a recently introduced solid soft TPE (Mediprene® Oil Free series) developed by VTC TPE Group, Inc Sweden.

As delivered soft solid TPE pellets of each kind were used to form films by extrusion using a Killion KL100 single screw extruder (Killion Laboratories, Inc., Houston, Tex., USA). The opening of the flat die was set between 0.2-3.0 mm for different film thicknesses and a customized calendar (Metaplast, Inc., Chassieu, France) was used to collect the film on a roll. Extrusion was performed at a temperature of 140-270° C., a screw revolution of 10-1000 rpm and a roller casting speed of 10-65 cm/min. The films had thicknesses according to the flat die opening, but in all cases the width of the film was 15.0 cm and the length of the film was greater than 10 m. For patterning, 4" TPE films were cut from the roll and successively rinsed with deionized (DI) water (18.2 MOhm cm), isopropanol and methanol (both from Fisher Scientific, Ottawa, ON, Canada), followed by drying in a stream of nitrogen gas.

Softness Characterization

Figure 2:
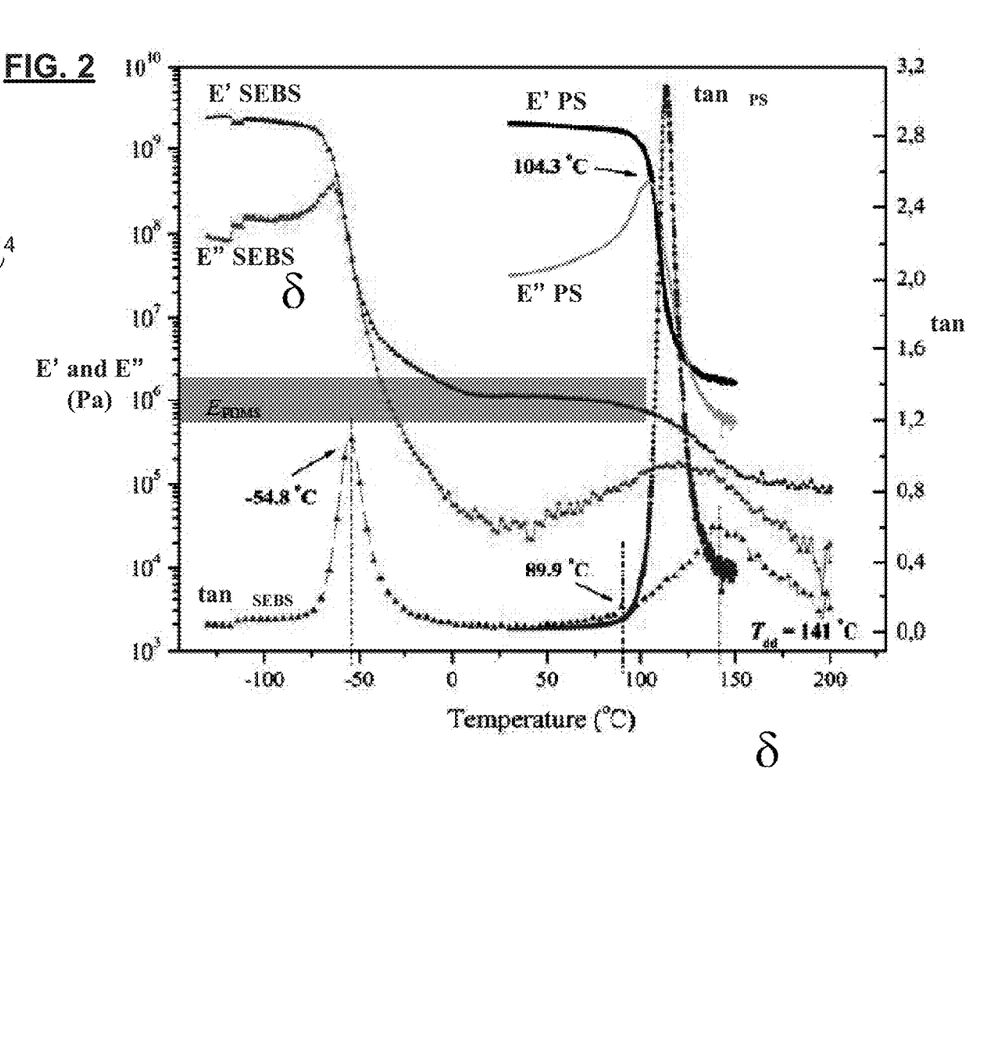
FIG. 2 is a graph showing DMTA measurements (E', E" and tan δ) for SEBS and rigid polystyrene.

TPE mechanical and thermal characterizations were carried out with a dynamic mechanical thermal analyzer (DMTA, ARES LS2 rheometer, Rheometric Scientific, Piscataway, N.J., USA), at temperatures ranging from −130 to 200° C. Storage (E') and loss (E") modulii were determined at 1 Hz with a strain of 0.02% and a heating rate of 2° C./min. FIG. 2 shows the storage (E') and loss (E") modulii as function of temperature for CL30 SEBS (as well as for polystyrene PS). In essence, E' and E" are a measure of the stored and dissipated energy related to the elastic and viscous responses of the material. The ratio of these modulii, E"/E', is the tangent of the phase angle shift $\delta$ between stress and strain vectors, which characterizes the damping behavior of a material. These parameters help determine phase transitions, which are detected as changes in the elastic modulii as well as peaks in the temperature curve of tan $\delta$ which was used to determine a suitable molding temperature for the material. The curves also reveal differences in morphological and mechanical properties for the two polymers and help explain bonding behavior of the SEBS material.

As shown in FIG. 2, the peak at −54.8° C. corresponds to the glass transition temperature of the ethylene-butylene soft blocks that are distributed throughout the material. The fact that this glass transition is far below an operating temperature of 0-100° C. is advantageous for achieving conformal contact and bonding at moderate temperatures, as it indicates liquid-like behavior of the soft block material, while the hard blocks provide support and retention of the soft block material.

Figure 3:
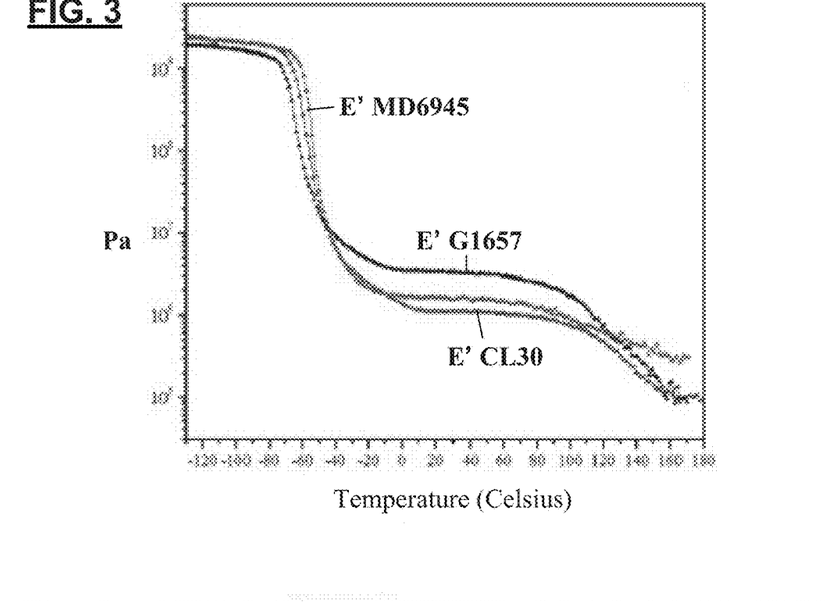
FIG. 3 is a graph of E' as a function of temperature for 3 different SEBS soft solid TPE films.

FIG. 3 shows graphs of E' storage modulii of the three SEBS film materials. Clearly shown is a so-called rubber plateau which extends from about 0-10° C. to 75-85° C. for each of the three materials. Modulii of 1.1, 1.6 and 3.4 MPa at 25° C. are obtained for CL30, DM6945 and G1657, respectively. These mechanical properties indicate that the thermoplastic materials that are soft like PDMS (i.e. 0.5-5 MPa), while with only 10-15% styrene content, are 1000 times softer than polystyrene (i.e. 1-5 GPa). On the other hand, its block-copolymer structure provides thermal resistance along with mechanical robustness superior to standard PDMS formulations, as exemplified by a relatively large elongation at break (e.g. 300-1200%) that can be achieved for the selected materials. Unlike PDMS, the soft blocks provide bonding capabilities above their glass transition, i.e. above ~−80±20° C. So at room temperature, the polymer chains can reorganize/reorient according to the contact surface properties, inducing conformal bonding without any heating and applied pressure. SEBS (like other solid soft TPEs) exhibit effective polymer-polymer interactions at ambient conditions. For this reason, styrenic TPE materials and some of its derivates are included in pressure sensitive adhesives (PSA), such as the famous post-it sticker, which can be glued to a broad range of supports, such as metal, glass or wood without mediation by heat, pressure or solvents. Similar to other adhesives, styrenic TPE materials possess solid and liquid properties alike, which enable it to wet another surface at the microscopic scale, while maintaining rigidity at the macroscopic level (see Creton Block Copolymers for Adhesive Applications, in: Macromolecular Engineering: Precise Synthesis, Materials Properties, Applications, eds. K. Matyjaszewski, Y. Gnanou and L. Leibler, Wiley-VCH, Weinheim (2007), 1731-1752).

Optical Characterization

A number of lab-on-chip applications involve optical reading, which demands for materials providing transparency, primarily in the UV-visible range. Optical transmission spectra were collected from one 1-mm-thick films of SEBS (CL30, MD6945, G1657 and SIBSTAR 072T) using a Beckman DU-640 spectrometer from 200 up to 1000 nm wavelength. Defining 50% transmittance as an acceptable limit in transparency, PDMS provides a transparency window that is the widest of the 3 materials (i.e. from 280 to 1000 nm). On the other side, for Zeonor and SEBS polymers, 50% transmittance is reached at 340 nm and 295 nm, respectively. This is sufficient for most commonly used fluorescent dyes, including Cy3 ($\lambda$ex=550 nm; $\lambda$em=570 nm) and Cy5 ($\lambda$ex=650 nm; $\lambda$em=670 nm), for which SEBS transparency reaches 90-92%. Styrenic TPE polymers are typically clear, because styrene domains are too small (e.g., 10-30 nm) to scatter light. Another attractive feature of these materials is that they show a relatively low auto-fluorescence background over a wide spectral range.

These materials offer a similar optical transparency and flexibility to PDMS while providing the possibility for structuration using known, industrially scalable, thermoforming processes such as injection molding and hot embossing.

Biocompatibility

In terms of bio-compatibility, with the Versaflex CL30 material, we succeeded in handling DNA and protein solutions for microfluidic spotting and we performed human cells cultures including smooth muscle cells, corneal and dermal fibroblasts on microstructured surfaces (M. D. Guillemette, B. Cui, E. Roy, R. Gauvin, C. J. Giasson, M. B. Esch, P. Carrier, A. Deschambeault, M. Dumoulin, M. Toner, L. Germain, T. Veres and F. A. Auger, Integr. Biol., 1, 196 (2009)

Thermoforming and Characterization

The devices used in this work were fabricated using two variants of thermal forming: i) standard vacuum-assisted hot embossing and ii) soft thermoplastic lithography. For either process, TPE films were cut with scissors from the extruded roll, cleaned with methanol and isoproponal and finally dried with nitrogen gas prior to microstructure patterning. Extruded films can be stored over long periods of time (e.g., two years) without any notable degradation, making it possible to use the material on demand and without any time consuming pre-compounding steps.

Hot Embossing

Hot embossing was carried out using an EVG 520 HE system (EV Group) equipped with heating and cooling modules on both upper and lower embossing plates. All embossing experiments were done under a primary vacuum of 0.1 mbar. In order to select an optimal embossing temperature for high-quality replication, the temperature variation of tan $\delta_{SEBS}$ (FIG. 2) is useful. A barely visible shoulder (blocked by the PS curve) is observed at 89.9° C. and is associated with the glass transition of the PS phase (while the glass transition for neat PS is observed at 104.3° C.). The difference in amplitude between those two PS glass transitions is related to the ultra-minority fraction of styrene content in SEBS. Most importantly, for embossing parameter determination and temperature service in use, the difference of 14.4° C. between those two transitions is related to a "lowering effect" and was interpreted as a consequence of premature molecular motions in polystyrene domains induced by the poly(ethylene-butylene) segmental mobility. For a more complete explanation, see Munteanua et al, J. Optoelectron. Adv. Mater., 2005, 7, 3135-3148, and Morèse-Séguéla et al., Macromol., 1980, 13, 100-107.

Most work on the embossing of hard TPs (i.e., PMMA, PC, and PS) recommends embossing temperatures ranging from 140-220° C. (i.e. about 40-90° C. above the glass transition), in order to have a good compromise between temperature and pressure. For styrenic BCPs, determination of optimized embossing temperature diverges from those guidelines. In fact, hard styrene nanodomains will not spontaneously dissociate at the lower glass transition, but gradually deform while retaining quasi-integrity in the poly(ethylene-butylene) matrix, as long as the temperature does not exceed the broad and large peak observed for the present materials at 141° C. Consequently in order to avoid any thermal history effect and to improve polymer flow behaviour, we need to fix an embossing temperature above that temperature, called by several authors "domain disruption temperature". For example, see C. Wang, Macromol., 2001, 34, 9006-9014, and N. Nakajima, Rubber Chem. Technol., 1996, 69, 73-81. Above this temperature, E' reaches a plateau region (attained at ~160-165° C.) with a stable value of 0.1 MPa, suggesting that an embossing temperature of 170° C. should be well suitable for high-quality motif replication.

Once top and bottom plates of the embossing machine reached 170° C., a force of 1.0 kN (1.3 bar) was applied for 2 min. With the force still applied, the system is cooled to 75° C., followed by a release of the pressure. Upon removal of the stack from the instrument, the embossed TPE film is peeled-off the mold.

FIG. 4 is a mosaic of 9 magnified images of microfluidic structures produced in accordance with the present invention. Patterned films shown in FIGS. 4(a)-(f) were formed by hot embossing of SEBS films. SEBS films were embossed under different temperature and pressure conditions (from 0.5 to 5 bars and 100° C. to 170° C.) for G1657, MD6945, SIBSTAR 072T, or Mediprene OF 400M. The motifs replicated varied as well. The replicated motifs are well-defined, indicating a high level of fidelity that can be achieved with this approach. Moreover, the surface is smooth and free of defects, showing a root mean squared (rms) roughness of 1.5 and 3.0 nm for areas that were in contact with silicon and SU-8 portions of the mold, respectively. Good uniformity of replication over 4" areas was noted. Herein roughness measurements were performed using a multi-mode Nanoscope IV atomic force microscope (Veeco Metrology Group, Santa Barbara, Calif., USA), operated at ambient conditions and in contact mode using silicon nitride cantilevers (NP-S20, Veeco) with a spring constant of 0.58 N/m.

Soft Lithography

Soft thermoplastic lithography uses little or no pressure beyond ambient atmospheric pressure and an elevated temperature to replicate a pattern on a film. This kind of replication is possible because of the mechanical and viscoelastic properties of the soft solid TPE materials. A film was first placed on the Si/SU-8 mold. An almost perfect contact was achieved if the depth of relief features is less than a few microns and the thickness of the film is greater than about 2.5 mm, thanks to the viscoelastic properties of the polymer. In the present examples, a 3 mm SEBS film (CL30) was used. The SEBS film is placed on a hot plate and heated to 170° C. for 2.5 min at atmospheric pressure. At this temperature, the solid soft TPE material turned opaque due to coalescence of the styrene nanodomains, accompanied by a considerable decrease in viscosity. At this point, the film generates sufficient pressure (~50 Pa) to ensure polymer displacement over micrometer scale relief distances. At the same time, the few remaining air bubbles trapped between the mold and the SEBS disappeared, which is attributed to the relatively high gas permeability of the soft solid TPE materials at elevated temperatures. Crystallized PS nanodomains interrupt the gas flow and retard permeation in comparison to the soft and more permeable EB polymer blocks. Upon completion of the thermoforming process, the stack is immersed in water for rapid cooling and hardening of the patterned SEBS film. The SEBS film becomes transparent as a result of nanophase separation, once the material is cooled.

For Ethylene Vinyl Acetate (EVA) films were patterned by soft lithography under ambient pressure, and the patterned film is shown in FIG. 4(h). The EVA film was 2.5 mm-thick, the temperature was raised to 100° C. for 3 min, and then the film was flash cooled by immersion in water.

FIGS. 4(g),(h) are SEM images showing that fluidic structures were replicated with excellent fidelity. No perceptible difference is found comparing patterns replicated by hot embossing with soft lithography. Inspection of the patterned surface by AFM indicated a rms roughness of 2.2 and 3.1 nm for areas that were in contact with silicon and SU-8 portions of the mold, respectively. As was the case for hot embossing, the same mold was used for a large number of replication cycles (e.g., >50) while retaining consistent quality of resultant replicas. Scanning electron microscope (SEM) images were taken using an S-4800 scanning electron microscope (Hitachi, Mississauga, ON) operated at an acceleration voltage of 1.0 to 1.5 kV.

High Aspect Ratio and Negative Profile Examples

Demolding is greatly facilitated by the flexibility of the solid soft TPE and high aspect ratio (AR) features can be reproduced with high fidelity. Due to the low elastic modulus and low melt viscosity of soft solid TPEs, we were able to show that it is possible to pattern high aspect features by thermoforming methods without the complications that are typically encountered with TP. Some examples of CL30 SEBS films patterned by hot embossing with low cost photoresist-based (SU-8) moulds are imaged in FIG. 5. FIG. 5a is an image showing two negative profile or undercut patterned features, i.e. features that have a higher cross-sectional area further from a plane of the mold, or the surface of the part. FIGS. 5b,c show high-density, high aspect ratio features that have been produced with excellent accuracy. Thin SEBS films patterned with structures having diameters as small as 10 μm in a 100 μm thick TPE slab (aspect ratio up to 10:1) are shown in FIG. 5c. All samples shown in FIG. 5, were prepared with the EVG 520 hot embossing system, under a primary vacuum of 0.1 mbar, at a processing temperature variation of 140° C. within a 10 min period embossing time.

Applicant has demonstrated that a variety of channels and features can be formed in microfluidic devices composed of soft solid TPEs, making them useful for the full array of microfluidic devices. Applicant has shown that low pressure and temperature forming regimes are possible, including film forming techniques.

Spin Coating

Applicant melted MD 6945 (an oil free SEBS) and the EVA polymer and diluted the polymer in different batches with TPE/chlorobenzene, or TPE/toluene dilutions in ratios ranging from of 1:2 to 1:1000. A prescribed volume of the polymer was dispensed into a center of a SU-8 photoresist mold that was spinning at between 0 and 6500 rpm. Thin films with thicknesses from 10 to 400 μm were produced. Naturally, thicker layers can be achieved by iterative depositions. Microstructures as small as 10 μm have been made, and smaller features should be possible.

During the spin coating, if the solvent did not fully evaporate, a post forming thermal treatment (at 100° C. for 4 min.) was used to complete evaporation. Like thermoformed TPE parts, spin coated parts can be easily separated from the mold, and the same advantages in terms of quality, aspect ratio, negative profile and bonding are noted.

Applicant has found that oil impacts strongly on the quality of SEBS films when formed by spin casting, which is attributed to the fact that inclusion of oil in as-sold polymers seems to prevent homogenous dilution of the soft solid TPE. Additives might be used to cure this. The spin coated films that contain oil have an abundance of defects.

Figure 7:
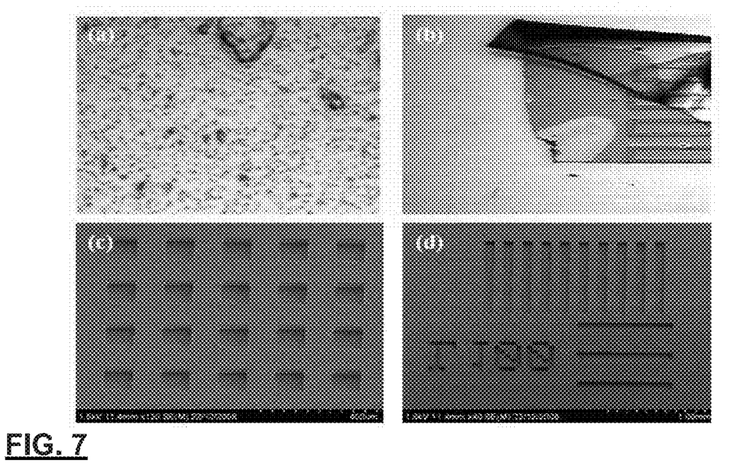
FIG. 7 is a mosaic of 4 images showing film patterning by spin coating.

FIG. 7 is a mosaic of images relating to the spin coating examples. FIG. 7(a) shows a soft solid TPE (CL30 TPE material, which contains 5-25% of oil) spin coated using chlorobenzene solvent. It will be noted that the discontinuities are apparent and the film produced is replete with defects. FIG. 7(b) is neat MD6945 spin coated with chlorobenzene over a microstructured SU-8 photoresist mold. FIG. 7(c-d) are SEM images showing a square microfluidic chamber array (200×200 μm$^2$) and linear channel array (100 μm) composed of MD6945.

Bonding

A chief advantage of patterned films of solid soft TPE is that these can be assembled by simply placing the patterned surface on a smooth substrate (plastics, glass, ceramics . . . ) or a like film (already patterned or not) with minimal pressure and temperature. Furthermore as no solvent or surface treatment is required, various surface modifications (like hydrophilic treatment) can be selectively performed on parts of the patterned film with less risk of damage. Because the bonding can be irreversible or reversible with or without thermal treatment (depending on a compatibility of the substrate) it is possible to treat the patterned films or parts with very sensitive materials and still provide sealed, functioning microfluidic devices. Furthermore there is no time sensitivity. Such patterned films can be stored for extended periods and then subsequently bonded. These facts make it much easier to assemble multi-layer devices.

As minimal force is required for bonding (in some cases no force is required at all once contact is made), and as the solid soft TPE adheres to itself readily, stacks of these patterned parts may be successively assembled without risk of deforming microchannels between other layers (as would follow from high pressure bonding strategies). Layers can be bonded first without applied pressure or increased temperature and bonding can be made irreversible with thermal treatment (with or without carefully selected pressure) depending on the selected grades of materials.

Some styrenic block copolymers like (MD6945, SIBSTAR072 or Mediprene OF 400M grades) produce permanent bonds to like materials without any applied pressure or heat, these soft solid TPEs therefore offer major advantages compared to PDMS, hard plastics and gel TPEs. Mediprene OF 400M is oil free. Every soft solid TPE attempted by the applicant produced a liquid-tight seal.

Figure 6:
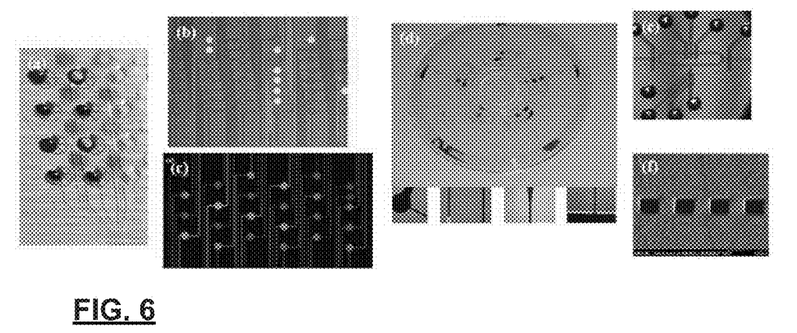
FIG. 6 is a mosaic of 6 panels showing various embodiments of bonded microfluidic devices.

FIG. 6 is a mosaic of 6 images showing bonding and loading efficiency of soft solid TPEs in microfluidic devices. FIG. 6a is a photograph showing an inlet part of a microfluidic device consisting of a SEBS CL30 patterned film bonded (non-permanently) to a polystyrene (hard thermoplastic) substrate. This bonding was performed at room temperature under ambient pressure by simply making contact between the film and the substrate. The bond line grew with no assistance until the whole material was covered. It will be noted that the device provides a seal sufficient to produce a useful device and the dyed liquid was retained in the channels as well as the inlet ports.

FIG. 6b is a photograph showing the same bonding features of a microfluidic device consisting of a SEBS CL30 patterned film bonded (non-permanently) to a polyclyclo (olefin) (hard thermoplastic) substrate. The bonding was achieved in the same manner as in FIG. 6a.

FIG. 6c is a fluorescence microscope image of DNA patterns realized with TPE microfluidic network temporarily bonded on an activated Zeonor 1060R substrate. The bonding was produced in the same manner, however, prior to bonding, the Zeonor substrate was treated in order to be compatible with the DNA immobilization protocol by: 1 hr ozonation treatment using an $O_3$ zomax OZO-2VTT ozone generator; followed by treatment with a solution of 8 mg 1-ethyl-3-(3-dimethylaminopropyl)carbodiimide and 2 mg N-hydroxysuccinimide (NHS) in phosphate buffer saline (pH=7.4). This image was taken of the Zeonor surface after the removal of the patterned film. The lines show clearly that the bonding was fluid tight. While no defect is apparent in the depicted array, the number of spots showing signs of cross-contamination (e.g., Cy3 and Cy5 fluoresce signal being present in the same area) was ~4% on average. Fluorescence emission was largely uniform among spots in the array, although fluorescence intensity decreased from left to right for both sections (e.g., ~20% for P1 and ~30% for P2). This finding was systematic for arrays produced with the particular design pattern, and results from depletion effects occurring along the corresponding trajectories. However, fluorescence intensities within the modified areas were uniform for both Cy3 and Cy5-labeled oligonucleotides, irrespective of the length of connected microchannels. One example of a microfluidic device is a spotter.

FIG. 6d is a CD-like microfluidic device consisting of a Mediprene OF 400M SEBS patterned film permanently bonded to a polyclyclo(olefin) disc. The bonding was performed at 100° C. for 10 min. At the bottom of this image one can observe some microchannels loaded with colored solutions.

FIG. 6e schematically illustrates two MD6945 SEBS films (one patterned) permanently bonded together at room temperature, with no applied pressure, proving that multi-layered devices are readily produced.

Mediprene OF 400M, MD6945 and SISBSTAR 072T also bond permanently to like layers at room temperature with no applied pressure within 2-3 days. Three and four layer microfluidic devices have been produced by iteratively applying Mediprene OF 400M SEBS patterned film on top of a polystyrene substrate.

FIG. 6f is a cross-sectional view of 5×5 μm$^2$ embedded microchannels obtained by non permanent bonding of CL30 TPE part on a Zeonor substrate at ambient temperature and pressure. The absence of any transition zone between the two materials indicates a high degree of conformity. Moreover, the microchannels are fully open and do not show any signs of deformation. The material therefore seems suitable for assembly and bonding of full thermoplastic microfluidic devices without the need of sophisticated equipment, or for surface treatments that may be detrimental to biological applications of microfluidic systems.

An optical profilometric investigation of microchannel stability throughout a thermal treatment (95° C. for 30 min.) of a microfluidic device consisting of a 2 mm thick Mediprene OF 400M SEBS film on a polyclyclo(olefin) substrate. While the majority of soft solid TPEs are not suitable for operation in temperatures as high as 95°, such temperatures are desired for PCR and other operations. Applicant has demonstrated that some soft solid TPEs are useful for this purpose. FIG. 8 shows 3 examples of before and after profiles at three locations. SEM image of three microchannels (15 μm wide/25 μm deep) after same thermal treatment. The channels did not collapse, and flow through them is expected to be substantially unaltered by the treatment.

The invention claimed is:

1. A method for forming a microfluidic device comprising:
    providing a composition containing a thermoplastic elastomer (TPE) resin;
    placing the composition onto a relief mold having at least one ridge defined thereon for molding a microfluidic channel;
    heating the composition adjacent the mold to a temperature above a highest glass transition temperature of the TPE, for a pressure-time of less than 5 bars seconds per micron of depth of the relief mold;
    cooling the composition to form a first part that is composed of at least 60 wt. % of the TPE and additives, and has a Shore A hardness that is less than 50, where each of the additives and the TPE is solid, at least from 0-50° C.;
    and removing the first part having a patterned surface from the mold.

2. The method of claim 1 wherein the composition provided is selected so that the first part:
    is composed of at least 80 wt. % of the thermoplastic elastomer and additives;
    is composed of at least 83.33 wt. % of the thermoplastic elastomer and additives;
    is composed of at least 90 wt. % of the thermoplastic elastomer and additives;
    is composed of at least 95 wt. % of the thermoplastic elastomer and additives;
    is composed of at least 99 wt. % of the thermoplastic elastomer and additives;
    is composed of at least 99.5 wt. % of the thermoplastic elastomer and additives; or
    has a microfluidic channel defined by the at least one ridge of the relief mold that extends between two of the following: junctions with one or more other ridges, raised structural features of the mold, and a mold limit.

3. The method of claim 1 wherein the composition provided is: solid; a film; liquid; or a solution.

4. The method of claim 1 further comprising applying the first part onto a second part having a meeting surface, the meeting surface covering enough of the patterned surface of the first part to enclose at least a part of the microfluidic channel.

5. The method of claim 4 wherein the second part:
    is composed of a same or different thermoplastic elastomer as the first part; is composed of a hard thermoplastic;
    is in the form of a film; or
    is composed of a less flexible material than the first part, and provides support for the microfluidic device.

6. The method of claim 4 wherein the second part has a second meeting surface bearing a pattern comprising at least one microfluidic channel having a cross-sectional dimension smaller than 100 microns.

7. The method of claim 4 wherein applying the first part onto the second part comprises reversibly bonding the first and second parts at room temperature, without application of any persistent pressure other than ambient pressure to provide sealed contact with the meeting surface of the second part.

8. The method of claim 4 wherein applying the first part onto the second part comprises irreversibly bonding the first and second parts to provide sealed contact with the meeting surface of the second part by applying a regime of:
    less than 2 bars at a temperature below 150° C., for less than 10 min.;
    atmospheric temperature and pressure;
    thermal treatment for 3 minutes at 100° C. at atmospheric pressure; or
    room temperature and atmospheric pressure for 4 days.

9. The method of claim 1 wherein the thermoplastic elastomer resin provided has a viscoelastic phase.

10. The method of claim 9 wherein the viscoelastic phase exhibits flow at temperatures: below 100° C.; below 30° C.; below 20° C.; below 0° C.; or below −15° C.

11. The method of claim 9 wherein the viscoelastic phase exhibits flow at a bonding temperature at which the first part is bonded to a second part.

12. The method of claim 9 wherein the viscoelastic phase exhibits flow throughout an intended operating temperature regime of the microfluidic device.

13. The method of claim 1 wherein the thermoplastic elastomer resin provided has soft blocks and hard blocks, the soft blocks composing 85-90% of the TPE resin that has a viscoelastic phase.

14. The method of claim 13 wherein the viscoelastic phase exhibits flow at temperatures below 20° C.; below 0° C.; or from 60 to −100° C.

15. The method of claim 1 wherein the thermoplastic elastomer resin provided comprises a styrenic block polymer, an olefin vinyl polymer, a thermoplastic rubber, a copolyester, a polyurethane, a polyolefin blend, a polyolefin alloy, or a polyamide.

16. The method of claim 1 wherein the thermoplastic elastomer resin provided comprises a styrenic block polymer, or an olefin vinyl polymer.

17. The method of claim 1 wherein the thermoplastic elastomer resin provided comprises a styrenic block polymer.

18. The method of claim 1 wherein the thermoplastic elastomer resin provided comprises SBS, SEBS, SEPS, SIS, SIBS, EVA, COPE, TPU, TPO, TPV, or PEBA.

19. The method of claim 1 wherein the thermoplastic elastomer resin provided comprises SBS, SEBS, SEPS, SIS, SIBS, or EVA.

20. The method of claim 1 wherein the thermoplastic elastomer resin provided comprises SBS, SEBS, SEPS, SIS, or SIBS.

* * * * *